(12) United States Patent
Gierens et al.

(10) Patent No.: US 9,394,687 B2
(45) Date of Patent: Jul. 19, 2016

(54) ILLUMINATING PARTITION

(71) Applicant: SAINT-GOBAIN GLASS FRANCE, Courbevoie (FR)

(72) Inventors: Anne Gierens, Compiegne (FR); Christian Navarro, Jaux (FR); Jingwei Zhang, Massy (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

(21) Appl. No.: 14/416,676

(22) PCT Filed: Jul. 17, 2013

(86) PCT No.: PCT/FR2013/051724
§ 371 (c)(1),
(2) Date: Jan. 23, 2015

(87) PCT Pub. No.: WO2014/016494
PCT Pub. Date: Jan. 30, 2014

(65) Prior Publication Data
US 2015/0204070 A1    Jul. 23, 2015

(30) Foreign Application Priority Data
Jul. 23, 2012 (FR) ........................ 12 57104

(51) Int. Cl.
*E04B 2/74* (2006.01)
*F21V 33/00* (2006.01)
(Continued)

(52) U.S. Cl.
CPC ............ *E04B 2/7401* (2013.01); *F21V 23/005* (2013.01); *F21V 33/006* (2013.01);
(Continued)

(58) Field of Classification Search
CPC . E04B 2/7401; E04B 2/74; E04B 2002/7461; G02B 6/0091; G02F 1/133615

USPC .................. 52/28, 204, 53, 204.71, 213, 215, 52/238.1; 362/92, 552, 632, 633, 634
See application file for complete search history.

(56) References Cited

U.S. PATENT DOCUMENTS

2004/0031234 A1* 2/2004 Emde ..................... F21S 11/00
52/786.11
(Continued)

FOREIGN PATENT DOCUMENTS

DE    103 22 561 A1    12/2004
EP    2 101 309 A1    9/2009
(Continued)

OTHER PUBLICATIONS

Written Opinion of the International Searching Authority as issued in International Patent Application No. PCT/FR2013/051724, dated Sep. 5, 2013.
(Continued)

*Primary Examiner* — Brian Glessner
*Assistant Examiner* — Adam Barlow
(74) *Attorney, Agent, or Firm* — Pillsbury Winthrop Shaw Pittman LLP (57) ABSTRACT

An illuminating partition includes lower and upper mounting profiled members, at least the lower profiled member including a carrier element arranged in the internal volume of the profiled member and including a platen, parallel to and at a distance from the central section of the profiled member and disposed between the diodes and the glazing unit, and serving as a support for the edge of the glazing unit, one of the lateral sections of the profiled member being mobile or removable so as to have access to the diodes which are associated with the profiled member in a removable manner.

26 Claims, 3 Drawing Sheets

(51) Int. Cl.
*F21V 8/00* (2006.01)
*F21V 23/00* (2015.01)
*F21Y 101/02* (2006.01)
*F21W 101/00* (2006.01)
*F21W 131/107* (2006.01)

(52) U.S. Cl.
CPC ....... *G02B6/0091* (2013.01); *E04B 2002/7461* (2013.01); *E04B 2002/7488* (2013.01); *F21W 2101/00* (2013.01); *F21W 2131/107* (2013.01); *F21Y 2101/02* (2013.01)

(56) References Cited

U.S. PATENT DOCUMENTS

2010/0059767 A1* 3/2010 Kawasaki ......... G02F 1/133615
257/89

2014/0153220 A1* 6/2014 Gierens .................... E06B 3/66
362/92
2014/0369063 A1* 12/2014 Kleo .................. F21V 33/0012
362/551

FOREIGN PATENT DOCUMENTS

| FR | WO 2012168659 A1 * | 12/2012 | ............. E04B 2/745 |
| WO | 02/052191 A1 | 7/2002 | |
| WO | 2008/089759 A1 | 7/2008 | |

OTHER PUBLICATIONS

International Search Report issued in International Patent Application No. PCT/FR2013/051724, dated Sep. 5, 2013.

* cited by examiner

ILLUMINATING PARTITION

CROSS-REFERENCE TO RELATED APPLICATIONS

This application is the U.S. National Stage of PCT/FR2013/051724, filed Jul. 17, 2013, which in turn claims priority to French Application No. 1257104, filed Jul. 23, 2012. The contents of all of these applications are incorporated herein by reference in their entirety.

The invention relates to an illuminating partition, in particular made of glass, and its mounting profiled members.

The illuminating partition of the invention is intended for any type of exterior and/or interior use, in a building or in a vehicle (notably for transport, etc.), in a public space, such as a separation between rooms, a separation for a compartment, a separation inside the same room, a door, a display window, a counter, a device for interior decoration, a balustrade, a furniture product, a lamp stand in particular in the form of a parallelepiped forming a separation, etc.

The use of such a partition is notably to provide a transparent and illuminating wall which provides the separation of a space; the partition allows an illuminating physical separation to be formed that bounds, on either side, areas of occupation of the space. The present application is entirely different from an illuminating module of the type for a display screen or for a signaling/information panel.

A partition is designed to rest with its whole weight on an receiving surface, generally a floor.

Although some illuminating modules totally different from those for partition applications (for example display screens) comprise in a known manner glass modules and lighting systems associated with the edge sections of the modules, the lighting systems for current illuminating partitions are never situated at the edge sections of the modules but disposed inside the partition against the main faces of the glass sheets of the modules, owing to the weight of the modules.

Indeed, the solution of associating the lighting system, often light-emitting diodes, with the bottom edge section of a glass module of the display screen type cannot be transposed to a glass partition, because the technical problem, in this latter application, of a risk of crushing owing to the weight of the module on the lighting system is not posed, which is not the case for a partition.

The aim of the invention is to provide a new generation of glass illuminating partition, which is robust, ecological with an installation that is simple and safe, and allowing the lighting system composed of light-emitting diodes to be readily and . reliably replaced, in particular in the case of a failure or of a change in optical performance, or in color, etc.

In the following part of the description, the terms "horizontal", "vertical", "upper", "lower", "high", "low" appear in the qualification of the elements used in the framework of a normal installation of the partition, in other words relating to a vertical notion with respect to a horizontal (flat) surface or floor on which said partition is laid (or fixed). The term "lateral" qualifies the side or the edge of an element in a vertical plane.

According to the invention, the partition comprises
- at least one glass module or glazing unit,
- diodes disposed on at least one support device of the PCB type, the PCB or PCBs potentially being on or accommodated in a receiving profiled member, the diodes being disposed facing the edge face of the glazing unit,
- at least one lower mounting profiled member and an upper mounting profiled member, each mounting profiled member comprising a central section, a first lateral section perpendicular to the central section, and a second lateral section perpendicular to the central section, parallel and separated from the first lateral section, and the mounting profiled member bounding an internal volume,
- at least one carrier element distinct from any element receiving the diodes, and separated from any element receiving the diodes for the lower mounting bracket, notably distinct from the PCBs or from the receiving profiled member for the PCBs, said carrier element being arranged in the internal volume of the lower and/or upper mounting profiled member, and comprising means of support such as a platen which is (parallel to and) separated from the central section of the mounting profiled member and situated between the edge face of the glazing unit and the diodes, and furthermore
- the platen of the carrier element is associated with the first lateral section of the profiled member and has a free edge facing the second lateral section of the profiled member (the free edge does not have to be in direct contact with the second lateral section, preferably being separated from it, or else being connected to it in a removable manner),
- at the bottom of the partition, the platen supports the glazing unit directly or potentially via a transparent wedge positioned underneath,
- and/or at the top, the PCB or PCBs and/or the receiving profiled member for the PCB or PCBs are laid on the platen (the platen is arranged near to the U-shaped open end of said upper profiled member, preferably spaced from the edge face of the glazing unit, in particular by around a millimeter),
- the PCB or PCBs with the diodes are dissociable from the partition, or the receiving profiled member for the PCBs are dissociable from the partition,
- the second lateral section of the lower and upper profiled members is mobile or removable, in such a manner that the PCB or PCBs or the profiled member for receiving the PCBs with diodes are accessible laterally (to the glazing unit), preferably directly on the PCBs or the receiving profiled member.

Thus, it is not necessary to dismantle the whole of the partition, in particular to first of all remove the glass module or modules away from the mounting profiled member, in order to access the diodes and to replace them.

The diodes are protected during the assembly of the glass modules, and they are very readily accessed at any time without the need to disassemble the modules.

In the following part of the description, the term "glazing unit" is equivalent to glass module.

The lighting system is arranged for example on two opposite sides of the partition, preferably on the upper and/or lower horizontal sides of the module or modules in the installed position of the partition.

For the top part of the partition, when a lighting system is also associated with it, the mounting profiled member therefore also comprises a lateral mobile or removable section so as to have access to the lighting system.

According to the invention, the mounting profiled member for an illuminating partition comprising a central section, a first lateral section perpendicular to the central section, and a second lateral section perpendicular to the central section, parallel to and separated from the first lateral section, in such a manner as to form a receiving volume with a general U-shaped cross section, comprises at least one carrier element arranged in the internal U-shaped volume and comprising means of support such as a platen parallel and separated from the central section of the profiled member and one edge of which is associated with the first lateral section of the profiled member, whereas the opposite edge, which is facing the second lateral section of the profiled member, is not associated in a fixed manner with said second lateral section, and the second lateral section of the profiled member is mobile or removable.

The term "connected" is taken to mean the qualification as being rigidly attached during the manufacture of the profiled member, the connected portion only forming one unitary assembly with the body of the profiled member, or as being rigidly attached after manufacture of the body of the profiled member, when the connected portion is set and permanently fixed to the body of the profiled member. These terms relate to a notion of permanent rigid attachment as opposed to a detachable attachment.

The body of the profiled member is understood to mean the whole manufactured assembly of the profiled member made as a single piece and forming as a single unit its various parts, central section, lateral sections and other elements.

The term "associated" in the following part of the description is not limiting in terms of being rigidly fixed or otherwise. It is understood to mean a junction of two parts forming a single body with each other or connected to each other by a permanent fixed rigid attachment, or else by a removable junction of two parts.

The employment of the term "mobile" in the following part of the description with regard to the lateral section is understood to mean capable of pivoting while at the same time being rigidly attached to the body of the profiled member by at least one part, or else removable, in other words capable of being totally detached.

The lower mounting profiled member of the invention allows the glass module or modules to be supported with regard to their weight while avoiding them resting on the lighting system and crushing it.

The carrier element, by its means of support (the platen), constitutes a platform for supporting the edge section of a glass module or glazing unit. In addition, it allows the glass module to be raised up in order to accommodate the lighting system under the platen without risk of resting its weight on the latter.

The association of the carrier element with the mounting profiled member is such that, although having a free edge which is not necessarily associated with the second lateral section of the profiled member, the carrier element does not risk being cantilevered or tipping when it supports the edge face of the glazing unit.

Furthermore, the removability/the mobility of one of the lateral sections of the lower or upper mounting profiled member and the fact that the platen is not rigidly attached (against or in a fixed manner) with this lateral section, offers notably the following advantages:

- an easy access under the platen and laterally in order to configure and/or replace the lighting system whether this be the diodes and their PCB or PCBs or the latter and their receiving profiled member, without having to remove the glass module if the latter is already in place;
- facilitates the installation of the module laterally without having to lift it in order to arrange it on the platen, the mobile lateral section having previously been moved aside.

Furthermore, the platen is sufficiently wide for, on the one hand, receiving the entirety of the edge section of the glass module, and on the other hand, covering the lighting system in order that, during the installation of the module, any impact of the module against the lighting system is avoided, the outside edge of the platen (edge facing the mobile lateral section when the latter is in place) forming a protective barrier with respect to the lighting system. If the module butts up against an internal part of the profiled member during the installation, the impact will advantageously occur on the outside edge of the platen without risking any damage to the lighting system.

In the raised position of the mobile lateral section, in other words when the mobile lateral section is arranged perpendicularly to the central section of the profiled member and laterally closes the cavity of the U, depending on the width of the platen, the outside edge of the platen may or may not be butted up against the internal face of the mobile lateral section.

According to one feature, the free edge does not comprise any return in the direction of the central section of the mounting profiled member interposed between the diodes and the second lateral section of the mounting profiled member or no barrier element is disposed between the diodes and the second mobile lateral section.

The carrier element forms a component which is attached by removable assembly or by rigidly fixing, via an edge opposite to the free edge, referred to as holding edge, associated with the first lateral section of the mounting profiled member.

The carrier element forms a machined/profiled member in a unitary manner with the first lateral section of the mounting profiled member. By forming an insert, the carrier element can thus be added to the already existing and usual mounting profiled member for current illuminating partitions.

The carrier element is removable from the partition and for example is not permanently fixed to (or integrated into) the mounting profiled member of the partition.

The partition comprises a receiving surface for the PCB or PCBs or the receiving profiled member for the PCB or PCBs, where this receiving surface can, for in the high position of the partition, be the platen (means of support) by its face opposite to the glazing unit.

The carrier element forms an insert (with the means of support (the platen) distinct from the mounting profiled member) and has a general shape at least in the form of an 'L' according to a cross-sectional view transverse to its longitudinal extension, and comprises the (plane) support surface arranged parallel (horizontal) to the central section of the profiled member and a perpendicular (vertical) side associated with the first lateral section of the mounting profiled member and/or with the central section, preferably abutted, fixed with clips, assembled by force. The L shape is not to be seen as limiting, in particular when the carrier element does not take the form of an insert.

As a variant, the element forms an insert (distinct from the mounting profiled member) and has a general shape in the form of an 'F' according to a cross-sectional view transverse to its longitudinal extension.

The carrier element comprises a shoulder arranged in the extension of the side and designed to cooperate by mutual interlocking with the surface of the first lateral section, said surface preferably having a cavity into which the shoulder is jammed, in such a manner that the carrier element is firmly held in place in the mounting profiled member.

The side and the shoulder are set against the internal face of the fixed first lateral section of the profiled member by their external vertical face opposite to the platen, and held by cooperation with said lateral section.

The edge of the platen opposite to the free edge, the side and/or the shoulder of the carrier element cooperate with the first lateral section of the profiled member via rigid fixing means of the adhesive bonding type for example and/or by mutual interlocking means, such as cavities and protruding sections.

The lighting system comprises light-emitting diodes whose light-emitting face is disposed facing the edge section of at least one side of the module and is spaced from the edge section of the module.

The glass module (notably the glass sheet) forms a guide for the light emitted by the diodes and comprises means for extraction of the light thus guided, for an illumination via at least one of the main faces of said module.

The diodes are arranged on at least one support and electrical power supply device referred to as PCB support.

Such an illumination using light-emitting diodes (or LEDs) associated with the edge section of the glass is a system with a low power consumption and is robust over time. The mounting profiled member hides the diodes and protects them.

The receiving surface integrated into the mounting profiled member for receiving/installing the lighting system can have a metal base, which allows the heat coming from the PCBs to be dissipated, guaranteeing the longevity of the diodes.

The diodes are independent from the glass modules. The modules used are standard glazing units without it being necessary to provide holes in the edge section of the glass module in order to dispose the diodes in them.

Advantageously, the diodes are of the "top-emitting" type rather than "side-emitting", in other words they illuminate in the direction opposite to their support device and not laterally. The emitting face of the diodes is parallel to the edge section of the module and preferably to the mounting (plane) surface.

The diodes may be encapsulated or capped in such a manner as to arrange an optical system, of the lens type for example, on top of them. This optical system, or quite simply the whole assembly of the lighting system, is absolutely not intended to play the role of means of support for the glazing unit, the platen of the carrier element being interposed between the diodes and the glazing unit.

According to one feature, the platen comprises at least one orifice or one full transparent window, preferably with an oblong geometry and continuous over virtually the whole length of the platen. Once the lighting system is in place in the mounting profiled member, this orifice or window allows the light emitted by the lighting system to pass through, the lighting system being disposed under the platen. Outside of the area of the orifice, the platen supports the entirety of the edge face of the glazing unit.

The PCB or PCBs or the receiving profiled member for the PCBs are installed free (laid on the receiving surface) or provisionally fixed by removability means (preferably laterally removable) by pivoting or retraction of the second lateral section from the mounting profiled member.

The PCB support or supports with the diodes may be removable on their own from the partition without thus being permanently fixed to the mounting profiled member of the partition. The PCBs are positioned, inserted in the U-shaped internal space defined by the mounting profiled member, in particular set against a receiving surface, being placed there or wedged in or attached by any removable means notably of the screw type or by attachment clips. In this way, the diodes on PCB support(s) can be installed/changed very quickly in the partition, providing a diode lighting system that is simple to manufacture and to install, and even to replace.

One or more receiving profiled members for one or more PCB supports with the diodes may be provided for receiving the PCBs. The receiving profiled member may be removable from the partition without thus being permanently fixed to the mounting profiled member of the partition. The PCBs are positioned, inserted in the receiving profiled member being laid on it or wedged in or fixed by any removable means notably of the screw type. The receiving profiled member is positioned, inserted in the U-shaped internal space defined by the mounting profiled member, in particular set against a surface, referred to as a receiving surface, underlying the means of support (platen) of the glazing unit for the lower profiled member. The receiving profiled member is placed or wedged in or fixed by any removable means notably of the screw type (which may be screwed in via the side in a horizontal plane) or by clip attachment. In this way, the receiving profiled member and the diodes on PCB support(s) can be installed/changed very quickly in the partition, providing a diode lighting system that is simple to manufacture and to install, and even to replace.

The removal of the PCBs and diodes, potentially of one or more receiving profiled members accommodating the PCBs and diodes, is carried out laterally, preferably by (substantially) horizontal translation. The mounting profiled member (its body or any element inserted in the internal volume) is designed so that no element, notably associated with the receiving surface on which the lighting system rests, presents an obstacle to this lateral removal, according to a substantially horizontal movement in the direction opposite to the first lateral section of the profiled member, the second lateral section of the profiled member having been previously removed or pivoted.

The non-permanent attachment or the blocking (for example by a guide rail) of the PCBs or of the receiving profiled members for the PCBs is carried out by any known means, a non-permanent adhesive bonding or by screws not however constituting a preferred mode of holding.

For the bottom or top part, the receiving profiled member accommodating the PCB or PCBs with diodes is inserted in the mounting profiled member or, for the bottom part, the receiving profiled member forms an integral part of the internal volume of the mounting profiled member, notably of the central section.

The lighting system with diodes can be carried by a receiving profiled member which is installed in the mounting profiled member as already indicated. If this receiving profiled member is removable, it is sufficient for the mounting profiled member not to have any element likely to impede the lateral removal of the receiving profiled member outside of the mounting profiled member. If this receiving profiled member is rigidly fixed to the mounting profiled member, its shape is designed so that it has no element likely to impede the lateral removal of the PCB or PCBs carrying the diodes outside of the mounting profiled member, in particular that it has no vertical return (significantly) bigger than the height of the diodes.

The bottom part comprises a receiving surface for the PCB or PCBs or the receiving profiled member for the PCBs, this receiving surface being associated with the carrier element or with the profiled member notably with the central section, and is disposed between the platen and the central section of the profiled member, notably parallel to the platen, to the central section, or to the edge face of the glazing unit, where said receiving surface may be full or hollowed out, and/or in two parts.

The association of the receiving profiled member or else of the support device for the diodes (PCB) in direct on the receiving surface may be effected in various ways; it is for example carried out by being laid directly on the receiving surface, or by means for removable attachment.

The partition can comprise an accommodation notably having two walls with returns, the accommodation being arranged between the receiving surface and the central section, the receiving accommodation, preferably taking the form of a parallelepiped, being designed to receive electrical cables connecting various lighting systems of the partition, the upper surface of the receiving accommodation being able to form said receiving surface.

Furthermore, nor does the platen of the carrier element (carrying the glazing unit in its low position) have any element likely to impede the lateral removal of the lighting system with diodes outside of the mounting profiled member, in particular, from its (free) edge facing the second lateral section of the mounting profiled member, it has no vertical return in the direction of the central section of the profiled member.

The end of the diodes can be situated in a manner where it is extremely close to the lower supporting surface of the carrier element (for example of the order of a millimeter); what is important is to be able to readily remove the PCB with the diodes from the accommodation situated under the carrier element.

Preferably, the diodes comprise semiconductor chips potentially covered with means for water-tight sealing.

The lighting system, in particular the top surface of the diodes, does not protrude with respect to the means for supporting the edge face of the glazing unit. The diodes which are facing the orifices in the platens of the carrier elements do not penetrate into said orifices (within the thickness of the platen). The diodes/the lighting system are arranged under the platen of the carrier element, itself not resting any of its weight on the diodes/the lighting system.

The partition comprises a single row of diodes along the edge section of the module or modules, distributed longitudinally in one or more groups of diodes on PCB support(s), or in the case of one or more modules with two glass sheets separated by a layer of gas forming a double glazing unit, there could be two rows of diodes each facing the edge section of each glass sheet.

The partition can comprise at least two transparent modules vertically butt-joined to each other and in that no lighting system is arranged on the vertical side of a glass module butt-joined to the other module. This configuration allows an edge to edge junction of the modules to be conserved which is virtually invisible or which forms an illuminated vertical line.

The glass sheet or sheets of the glass module are constructed from a glass having a high light transmission, of at least 85%, when the measurement is performed under D65 illumination on a glass sheet with parallel faces of 4 mm thickness.

The glass of the modules can be tempered. Furthermore, the modules could exhibit all kinds of usual properties for partitions, such as acoustic properties.

The bottom of the receiving profiled member or of the receiving surface in contact with the lighting system is made of a thermally-conducting material in order to dissipate the heat emitted, in particular, by the diodes forming the lighting system.

In one variant, the gap separating the diodes from the carrier element (from the support surface), although the separation height is very small, could comprise side walls for guiding the light. These walls could for example be associated with the receiving profiled member for the lighting system, this receiving profiled member then being removable in its entirety in order to access the PCBs with diodes. These walls would optimize the redirection of the light emitted by the diodes in the direction of the module.

The mounting profiled member is preferably not directly fixed to the main faces of the module; only sealing means may be associated with the upper end of the mounting profiled member between the faces of the module and the lateral sections of the profiled member. The sealing means are preferably removable, being notably fixed by clips.

The central section of the mounting profiled member, parallel to the edge section of the module, preferably has holes, notably for fixing said mounting profiled member by screwing to the mounting surface prior to installation of the lighting system and of the modules.

The lower mounting profiled member of the partition comprises at least one transparent module, at least two carrier elements arranged at the respective distal ends of the module and only running partially over the length of said module. By way of example, each of the two carrier elements has a length of 30 mm and a width of 20 m. The carrier elements allow a panel of 45 kg with horizontal dimensions of 1.10 m and vertical dimensions 2.80 m to be supported. With regard to the other dimensions, the height of the profiled member is for example 35 mm.

According to the invention, the illuminating glass partition is notably intended to be associated (installed) between a lower receiving surface (ground or other lower surface) and an upper receiving surface (ceiling or other) and preferably at the very least associated with (sitting on or fixed to) a lower surface.

The illuminating partition of the invention is designed for any type of exterior and/or interior use, in a building or in a vehicle (notably for transport, etc.), in a public space, such as a separation between rooms, compartment, a separation within the same room, in order to form a door, a display window, a counter, a device for interior decoration, a balustrade, a furniture product, a lamp stand in particular taking the form of a parallelepiped, etc.

The use of such a partition is notably to provide a transparent and illuminating wall whose function is to separate a space; the partition allows an illuminating physical separation to be formed bounding areas of occupation of the space on either side. This type of . application totally different from an illuminating module for a display screen or similar illuminating panel which is designed to be hung from a wall, or which would be encapsulated within a carrier frame.

Furthermore, the partition (the glass sheet) is preferably transparent, especially away from the means of extraction of the light which would be associated with it creating for example a satin finish aspect, or the glass sheet could have a semi-reflecting coating on a main face, of the one-way mirror type for example such as the product marketed under the name Mirastar. It is furthermore preferred for the illumination to be visible from both sides of the module.

The mounting profiled member is preferably made from a material which guarantees that the whole of the internal cavity will not be made visible from the outside after installation, in particular by rendering the lighting system and the support element invisible.

It should be noted that the mounting profiled member is not necessarily fixed to the ground but could be fixed onto another receiving surface.

Furthermore, the partition is not necessarily fixed, it may be mobile with respect to its associated surface (ground, ceiling, etc.).

The height of the partition is not necessarily the height between the ground and (potentially) the ceiling.

Lastly, the invention provides a method for assembling the partition (such as previously described) between a lower surface (the ground, a floor, etc. . .) and an upper surface (ceiling or similar), and in which:

the lower mounting profiled member is sitting on or fixed to the ground and the upper mounting profiled member to the ceiling (preferably by screwing through the central section of the profiled member), the carrier element (notably the support surface) is arranged in the lower mounting profiled member, if the latter is not already integrated (since having been previously attached onto or forming an integral part of the body of the profiled member), and potentially also into the upper mounting profiled member, whatever the reason for the installation of the partition, the second mobile lateral section of the mounting upper and lower profiled members is pivoted or detached, the diode lighting system is installed in the upper and/or lower mounting profiled member or members by placing it on a receiving surface, and the PCBs and diodes are preferably disposed in a receiving accommodation (of a receiving profiled member for example) notably associated with the mounting profiled member, if the ground is not perfectly flat, one or more wedges could be laid on the carrier element or elements (on the means of support) of the lower mounting profiled member, the wedge being transparent, the edge of the lower edge face (the edge nearest to the installer) of the glass module or modules is laid on the means of support (the platen) for the carrier element or elements of the lower mounting profiled member, the glass module or modules are tilted in a direction away from the installer, so as to bring the upper part of the glass module or modules into the upper mounting profiled member and to make the whole of the lower edge face of the modules rest on the platen of the carrier element or elements, the second mobile lateral section of the lower and upper mounting profiled members are put back in place, hermetic sealing means are placed on the open distal end of the lower and upper mounting profiled member between the lateral sections of said profiled member and the module or modules.

Figure 1:
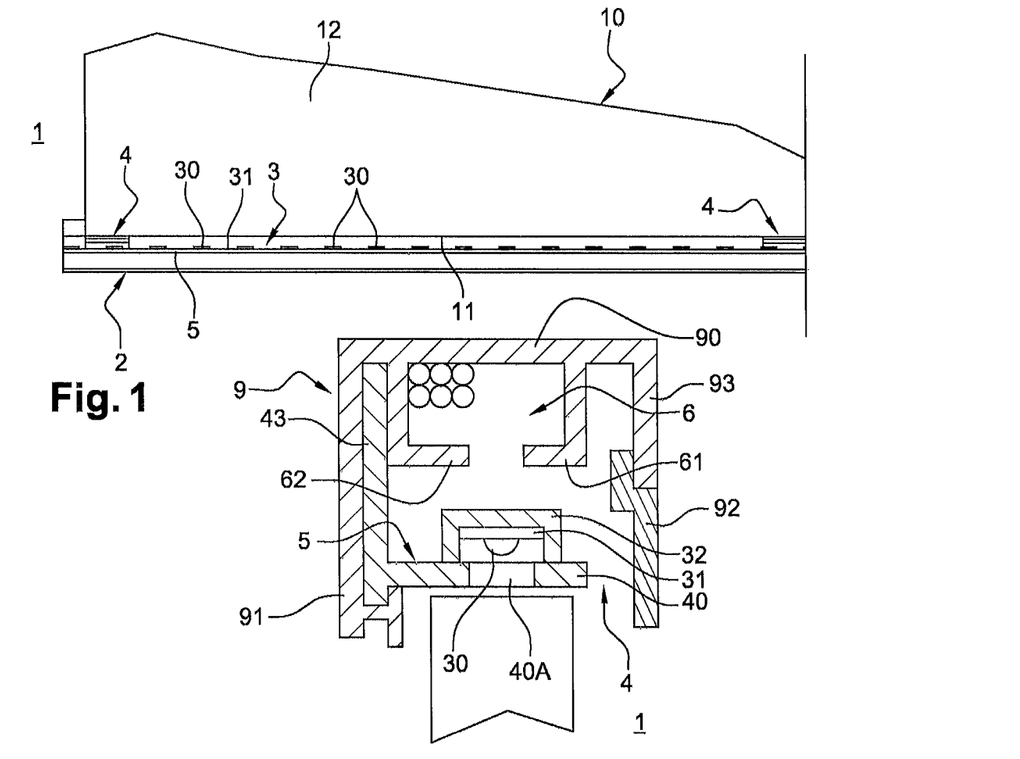
FIG. 1 illustrates schematically a cross-sectional and partial face view of a glass illuminating partition according to the invention.

The present invention is now described with the aid of examples that are purely illustrative and non-limiting for the scope of the invention, and based on the appended drawings, in which:

FIG. 3 is a variant of FIG. 2 with regard to the holding of the PCBs of the lighting system for the lower profiled member, and having retracted the removable lateral section from the mounting profiled member;

FIG. 4a is a bottom view of a carrier element designed to be integrated into the mounting profiled member in order to support the weight of a glass module;

FIG. 4b is a transverse cross-sectional view of the carrier element in FIG. 4a;

FIG. 1 illustrates schematically the lower and partial part of a transparent and illuminating partition 1, in particular made of glass, installed by means of at least one lower mounting profiled member 2 of the invention.

The partition is mounted vertically, for example between the ground and the ceiling of a room, (floor and/or roof of a vehicle) having a height adapted to the use.

The partition 1 comprises at least one transparent module 10, preferably using glass, and potentially several modules in a vertical plane juxtaposed in a horizontal direction so as to provide the appropriate width of the partition.

The term "transparent" in the description is understood to mean such as to enable the transmission of light.

The glass module 10 is formed from a monolithic piece of glass or from a glass sheet laminate having at least two glass substrates and an interlayer of plastic material, or else from an insulating glazing unit having two glass substrates separated by a layer of gas such as air.

The glass substrates are preferably made of a glass having a high light transmission, of at least 85%, when the measurement is performed under a D65 illumination on a glass sheet with parallel faces of 4 mm thickness. Preferably, the glass will be of the type known as "extra-clear", such as DIAMANT® glass marketed by the company SAINT-GOBAIN GLASS.

The glass module can exhibit all the functionalities known to those skilled in the art, of the type based on properties such as thermally insulating (functional coatings), acoustic, reinforcing, etc.

The glass sheets for a multi-laminate module will for example have a thickness of 5, 6 or 8 mm.

The glass sheet for a monolithic module will preferably be tempered and will preferably have a thickness of 10 or 12 mm, for example.

The partition 1 provides an illumination generated by at least one module or each of the glass modules.

The partition 1 is illuminating and comprises a lighting system 3 arranged facing one or more edge sections 11 of the glass module.

Preferably, the diodes 30 of the lighting system 3 are disposed facing the lower edge section (such as illustrated in FIG. 1) and upper edge section of the module, hence of the partition, in the installed position of the partition and not against the vertical edges so as not to modify the esthetic aspect of the partition at the abutment junctions between modules.

Figure 2:
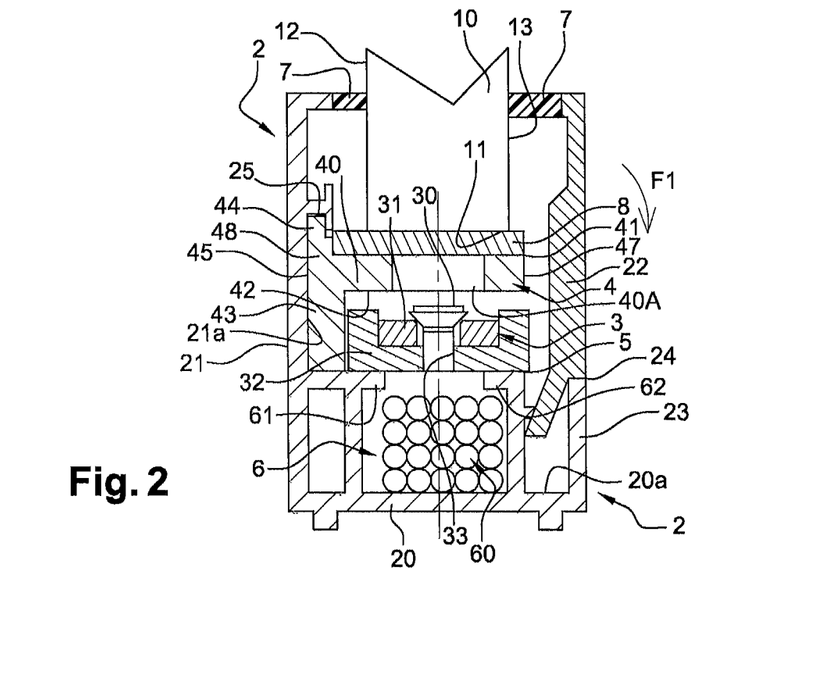
FIG. 2 is a schematic view of a transverse cross section of the partition in the installed position of a glass module respectively in the lower and upper mounting profiled members of the invention; for convenience, the height of the partition has been partially cut so as not to display the whole height of the glass.

FIG. 2 illustrates the lower 2 and upper 9 mounting profiled members of the partition. The upper mounting profiled member will be described later on.

The lighting system 3 is accommodated in the lower mounting profiled member 2 which, according to the invention, is designed such that, on the one hand, the glass module 10 does not rest directly on said lighting system, the diodes thus avoiding any risk of being crushed due to the weight of the module, and on the other hand, the diodes on a PCB can be changed, for example in the case of a failure, without having to dismantle the whole of the partition or the glass module in place.

The lighting system 3 is arranged such that it is hidden from an observer looking face on at the installed partition.

The partition comprises means of diffusion of the light associated with one of the faces of the glass for a monolithic module (only one glass sheet) or, when the module comprises at least two glass sheets (laminated module or insulating module of the double-glazing unit type), associated with one of the internal faces of one of the glass sheets.

The diffusion means are preferably formed by serigraphy on the glass and are for example enamel. They extend over the glass according to a chosen arrangement and chosen patterns. They do not necessarily cover the whole of the surface of the glass of the module and can accordingly define areas referred to as 'functionally dark'. The darker areas are for example disposed centrally or on the periphery of the module. They consist for example of transparent areas (clear glass) or opaque areas, or else of mirrors.

The module 10 is illuminated by the lighting system 3 facing the edge section 11 of the module. The light coming from the diodes 30 which are situated facing the edge section 11 of the module, for example facing the centre of the edge section, propagates within the thickness of glass (or of the interlayer) in a direction transverse to the planes formed by the main faces 12 and 13 of the module (FIG. 2) so as then to be redirected by virtue of the diffusion means toward the outside of the module.

For a monolithic module, the diodes are arranged facing the edge section of the single glass sheet. For a module with two glass sheets separated by a layer of air, the diodes are preferably disposed facing each of the edge sections of the glass sheets.

As expressed hereinabove, the diodes are disposed facing the upper and lower horizontal sides of the module.

The mounting profiled members 2 and 9 of the invention, shown in FIGS. 1 and 2, run longitudinally to the lower and upper sides, respectively, of the glass module 10, and have the general cross-sectional shape of a 'U' in the position of use.

The mounting profiled member 2, 9 is preferably made of metal, either of aluminum or of stainless steel, but can be made of plastic material, in particular a composite material.

The profiled member 2 (FIG. 2) has a body of the U-shaped type comprising a central section 20 and two lateral sections 21 and 22 being perpendicular to the central section and parallel and spaced out with respect to each other.

Figures 3, 4A, 4B:
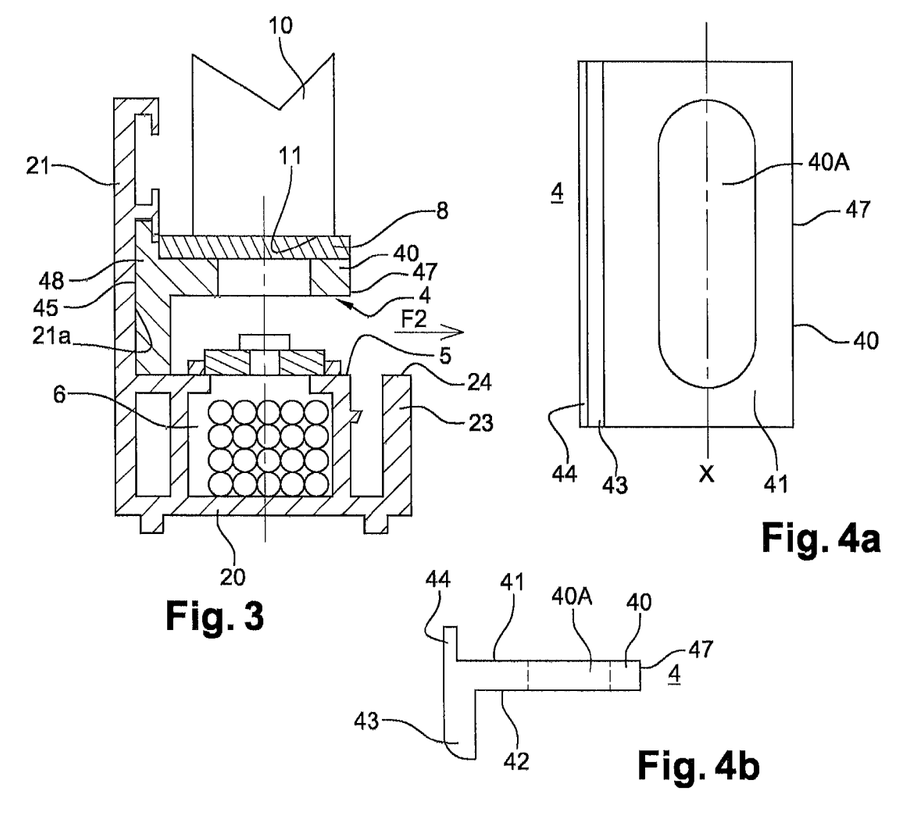

According to the invention, the second lateral section 22 of the mounting profiled member 2 is mobile or removable, enabling access to the inside of the profiled member at any time, in particular after the installation of the partition. FIG. 3 illustrates the profiled member 2 without its second lateral section.

The lateral section 22 can be mobile or removable with respect to the point of junction with the central section 20, or else such as illustrated in FIGS. 2 and 3, at the distal end 24 of a fixed extension 23 protruding perpendicularly from the longitudinal edge 20a of the central section 20.

The lateral section 22 is mobile in the sense that it pivots with respect to a longitudinal axis which follows the edge 24 of the extension 23, and forms a hinge esthetically invisible from the exterior of the profiled member. The pivoting of the lateral section takes place in a direction toward the exterior of the profiled member 2, in the opposite direction to the first lateral section 21 (such as indicated by the arrow F1 in FIG. 2).

As a variant and in a preferred manner, the second lateral section 22 is removable. Advantageously, the removability means are formed by clip attachment means.

The first lateral section 21 of the mounting profiled member 2 is preferably fixed and rigidly attached to the central section 20.

The mobility of the second lateral section 22 gives a direct access to the diodes of the lighting system, the latter being laterally retracted by translation according to the arrow F2 (FIG. 3).

Removable hermetic sealing means 7 are provided and are affixed against the module 10 and the free ends 21a and 22a of the respective lateral sections 21 and 22 of the mounting profiled member. These hermetic sealing means are for example fixed by clips.

The mounting profiled member 2 is designed to be rigidly fixed to the attachment surface by attachment means not shown, such as screws which pass through the central section 20 and are designed to cooperate with said attachment surface. It will be preferred not to use self-threading screws; previously-formed orifices will be provided in the central section. The screws will be distributed along the length of the mounting profiled member.

A mounting profiled member 2 can have a length equivalent to a glass module or to several glass modules.

According to the invention and with regard to FIGS. 1 to 3 and 5 and 6, the mounting profiled member 2 comprises at least one carrier element on which the glass module 10 and a receiving surface 5 carrying the lighting system 3 rest.

Furthermore, the mounting profiled member 2 can comprise an accommodation 6 bounded by two walls with a return toward the inside of the profiled member and within which run power supply cables 60 for the lighting system 3 disposed along the mounting profiled member.

On the one hand, the carrier element 4 is capable of supporting the weight of the glass module without flexing, and on the other hand, it provides a bracing between the lower edge section 11 of the module and the upper end of the lighting system 3 so as not to push against the latter.

Furthermore, the carrier element 4, arranged on top of the lighting system and covering it, protects the latter from impacts during the installation of the module in the profiled member, whether the module is brought in laterally to the lighting system and/or vertically to the latter.

The carrier element 4 is detailed in FIGS. 4a and 4b.

The element 4 runs along a longitudinal axis X (FIG. 4a) which is designed to be parallel to the longitudinal axis of the mounting profiled member 2, and exhibits, transversally to the longitudinal axis, a general cross section at least in the form of an 'L' (FIG. 4b).

The carrier element 4 comprises means of support such as a platen 40 and a side 43 perpendicular to said platen and connected to one of the edges of the surface 40.

The platen 40, referred to in the following as platen, possesses two main faces, one referred to as upper 41 which is designed to carry the edge section 11 of the glass module (FIG. 2), and an opposing one 42 referred to as lower, which is facing the central section 20 and the lighting system 3.

For the lower mounting profiled member 2, in order to compensate for the defects in flatness of the ground, the partition is arranged to be level by virtue of one or more wedges 8. The wedge is disposed on the means of support or platen 40 of the carrier element 5, the glazing unit or units resting by their edge section on the wedges. The wedges are transparent so as to transmit the light emitted from the diodes. The wedges are for example made of polymethyl methacrylate (PMMA) also known under the name of Plexiglas®.

The side 43 of the carrier element 4 allows the integration/the association of the latter when the latter is inserted in the mounting profiled member.

In addition, the side 43 participates in the rigidity of the carrier element 4 when the latter supports the glass module.

The side 43 runs from the platen 40 preferably in the direction of the central section 20 of the profiled member (FIG. 2).

Preferably, the platen 40 and the side 43 form a single-piece assembly.

Advantageously, in order to guarantee the holding in position of the carrier element 4 in the mounting profiled member 2, said element comprises a shoulder 44 arranged in the extension of the side 43 and connected to the edge of the platen 40.

With reference to FIGS. 2 and 3, the carrier element 4 is rigidly fixed to the interior of the mounting profiled member 2 such that the side 43 and the shoulder 44 are set against the internal face 21a of the first fixed lateral section 21 of the profiled member by their external vertical face 45 opposite to the platen 40, and held by cooperation with said lateral section 21.

The retention of the carrier element 4 is guaranteed by the cooperation of the end 48 of the platen 4, of the side 43 and/or of the shoulder 44 with the lateral section 21 of the profiled member. This cooperation may be achieved by rigid attachment means of the adhesive bonding type for example and/or by mutual interlocking means between the body of the profiled member (the lateral section 21) and the carrier element 4, such as cavities and protruding sections.

The example illustrated here shows the interlocking of the shoulder 44 in a receiving cavity 25 arranged in the wall of the lateral section 21 of the profiled member 2. Thus, when the module is installed, the platen 40 does not risk tipping since retained by the shoulder 44 stuck in the cavity 25.

Figure 6:
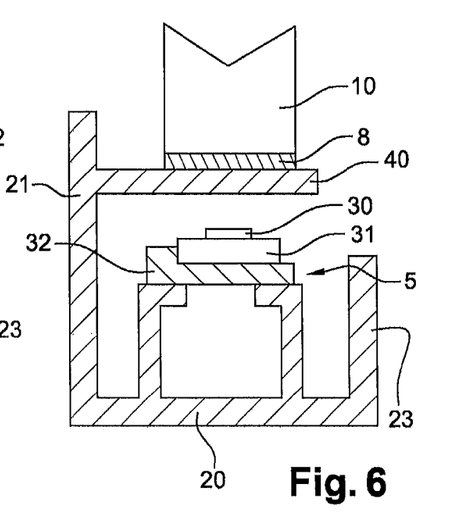

As a variant, the carrier element 4 may not form an independent and assembled element but may form an integral part of the body of the profiled member after manufacturing of said profiled member, the carrier element and the body of the profiled member forming one single unitary assembly. In this case, the side 43 corresponds to a part of the fixed lateral section 21 of the profiled member, the carrier element being limited to the platen 40 (FIG. 6).

The carrier element 4 is preferably made of metal when it takes the form of an insert. It could be made of plastic material, notably a composite with reinforcement fibers, when it is integrated into the body of the profiled member if the latter is produced for example by extrusion.

The thickness of the platen 40 (dimension transverse to the main faces of the platen) is for example of the order of 3 to 5 mm.

The assembly of the side 43 and of the shoulder 44 has a height (dimension perpendicular to the platen 40) of the order of 10 to 15 mm.

Such as expressed hereinabove, the width of the platen 40, and of the wedge, is sized for supporting the whole of the edge section of a module. It is for example of the order of 20 mm.

In a position associated with the mounting profiled member, the platen 40 has a free edge 47 opposite to the side 43 and the shoulder 44. This free edge may or may not be abutted against the mobile lateral section 22.

According to the invention, the free edge 47 is not connected in a fixed manner to the mobile lateral section 22 and does not comprise any return in the direction of the central section 20 of the profiled member, a fact which allows a lateral access to the cavity of the profiled member, and to the diodes when the mobile lateral section is detached or open (position not perpendicular to the central section) and thus ensures the easy installation or replacement of the lighting system 3 situated under the platen 40.

Preferably, according to the invention, the mounting profiled member 2 comprises a plurality or at least two carrier elements 4 which are limited in length (dimension along the X axis and parallel to the longitudinal axis of the mounting profiled member). The length of an element is for example of the order of 30 mm.

Two carrier elements 4 arranged at the two respective ends of the glass module 10 suffice to support its weight, a module for example of 3 $m^2$ having a weight of around 90 kg, with a distribution of 45 kg per platen.

One single carrier element could of course be used if it has a suitable length to extend over a large part, or even the entirety, of the length of the module. However, for reasons of material costs, this solution is not preferred.

According to the invention, the platen 40 comprises at least one orifice 40A for passage of the light from the lighting system placed under the platen (if the latter is notably opaque). This orifice has a shape that is notably oblong aligned along the X axis. This orifice has for example a width of 8 mm.

Depending on the type of lighting system. 3 and on the length of the carrier element 4, one continuous orifice or several orifices could be provided. For diodes for example, one orifice can be provided in front of each diode; this variant is not however a preferred solution.

It is more convenient, and in order to optimize the transmission of the light, to form orifices in the platen. However, it may be envisioned to design a platen whose surface facing the lighting system is full and transparent and so not requiring any holes.

According to the invention, the lower mounting profiled member 2 comprises a receiving surface 5 for the lighting system which is distinct from the platen 40 since disposed underneath and separated from the platen 40.

This receiving surface 5 may directly consist of the internal face of the central section 20 of the profiled member. However, in such a manner as to allow the laying of cables in the bottom of the profiled member, the receiving surface 5 constitutes a surface distinct from the central section 20 of the profiled member.

The receiving surface 5 may form a single piece with the body of the mounting profiled member 2.

With reference to FIGS. 2, 3 and 6, the receiving surface 5 may be formed for example from two upper returns 61 and 62 from the walls of the accommodation 6 for the cables.

When the mobile lateral section 22 is connected to the fixed extension 23 of the profiled member, in order to be able to laterally remove the diodes out of the profiled member, the receiving surface 5 is positioned at least at the height of the distal end 24 of the fixed extension 23.

Figure 5:
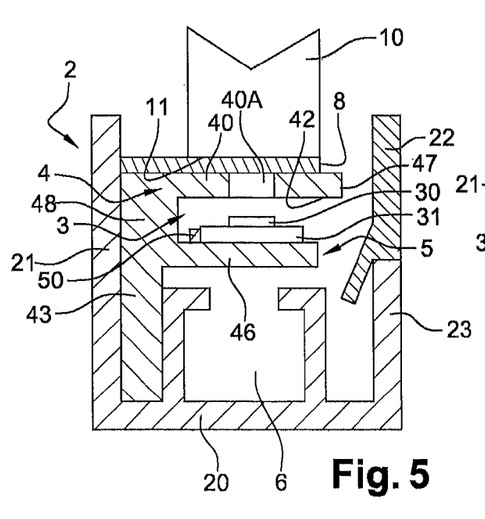
FIGS. 5 and 6 are variants of FIG. 2 with regard to the carrier element for the lower profiled member.

The receiving surface 5 can form part of the carrier element 4, such as illustrated in FIG. 5. The carrier element 4, whose general shape is that of an 'F', comprises a lower tray 46 connected perpendicularly to the side 43 (opposite to the shoulder 44) and parallel and separated from the platen 40. The spacing between the face 42 of the platen 40 and the tray 46 is adapted so as to accommodate the lighting system 3 and to remove it if necessary.

The lighting system 3 is formed from a plurality of light-emitting diodes 30 (LEDs) arranged in a known manner on one or more support and electrical power supply device(s) 31, which are typically printed circuit boards (PCBs). An electrically-insulating varnish is provided on the connections to the diodes.

The diodes 30 (like their PCB support) are not embedded in sealing resin avoiding too great a thickness of the latter with their support. Advantageously, the diodes comprise a semiconductor chip combined with an optical resin (phosphor dot)

and potentially a sealing layer, in particular deposited by spray gun, covering the diodes and the surface of the support.

The width of the support device PCB 31 is for example less than or equal to the width of the edge section of the module or of a glass sheet.

By way of example, the elements have the following dimensions:

Width of the PCB: 10 mm or 5 mm,
Thickness of PCB: 2 mm,
Height of the diodes: 2 mm.

The support and power supply devices or PCBs 31 are directly mounted onto the receiving surface 5 (FIG. 5) or else in a receiving profiled member 32 (FIG. 2) arranged on the receiving surface 5. The PCBs are electrically connected to a centralized electrical connection not shown.

The assembly of the PCB devices with the diodes on the receiving profiled member 32 can be carried out at the factory, the profiled members 32 being delivered for the installation of the partition with the PCB or PCBs with the diodes already integrated. The insertion of the PCB or PCBs with the diodes may also be done during the installation of the partition, by inserting the diodes via their PCBs 31 in the receiving profiled members 32.

Several devices 31 may be arranged adjacent to one another along the receiving profiled member 32.

With reference to FIG. 2, the PCBs can be attached to the receiving profiled member by fixing screws 33.

The association of the receiving profiled member 32 or else of the PCB 31 directly on the receiving surface 5 can be carried out in various ways, for example by simply being placed, or by removable attachment means (even with a single lateral access), or else by wedging means that are removable or not, such as a plurality of lugs 50 disposed at least laterally along a longitudinal axis on the side of the first lateral section 21 spaced out by the width of the PCB (FIG. 5).

In another variant (FIG. 6), the receiving profiled member 32 forms an integral part of the mounting profiled member, for example machined into the material constituting the mounting profiled member.

The association is such that the lateral translation of the receiving profiled member 32 or of the support device PCB 31 outside of the receiving surface, and toward the outside of the profiled member, may be readily implemented with no fixed barrier element between the lateral section 22 and the diodes.

The receiving profiled member 32 has a general shape with a cavity, of the type with a U-shaped cross section, for accommodating the PCB 31 in a push-fit manner. For the lower mounting profiled member, the receiving profiled member preferably has a vertical return, on the side of the mobile lateral section, which does not go past the upper end of the diodes.

Figure 7:
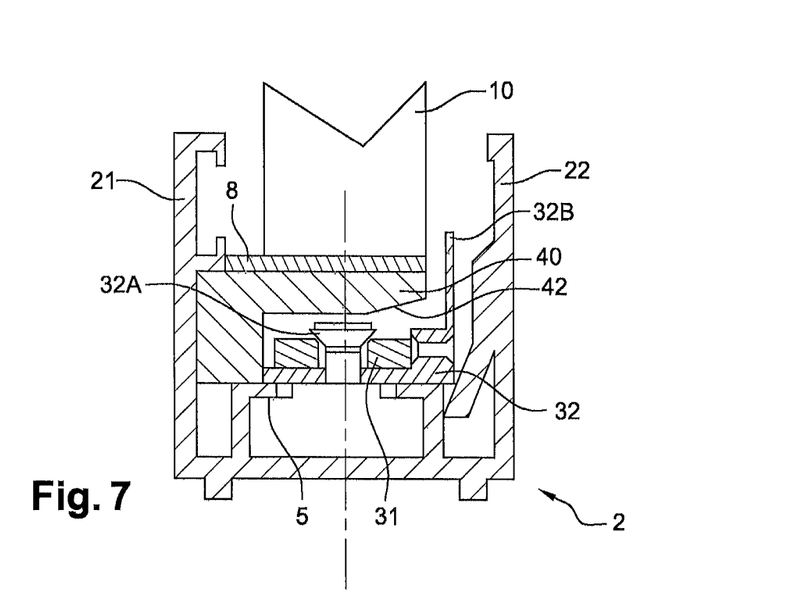
FIG. 7 is yet another variant of the carrier element for the lower profiled member and the PCB removable, attachment.

In yet another variant (FIG. 7), the PCB 31 is attached in a removable manner by a screw 32A in a receiving profiled member 32. The receiving profiled member 32 rests on the receiving surface 5. The receiving profiled member 32 comprises a protruding vertical tab 32B allowing the diodes to be readily accessed when the mobile lateral section 22 is retracted. Furthermore, in order to facilitate the access, the lower face 42 of the platen 40 may be beveled.

In yet another variant not shown, the receiving profiled member 32 accommodating the PCB, rather than being simply laid on, could be held in a removable manner in the mounting profiled member, for example by a horizontal lateral screw attachment into the body of the profiled member.

Advantageously, means for dissipating the heat are provided under the surface of the support devices 31 (PCB), in a rigidly fixed manner or otherwise. This allows the heat emitted by the diodes 30 at their connection to the PCB 31 to be dissipated. Preferably, the carrier base of the PCB support or supports (themselves made of metal or otherwise) forms these means for dissipating the heat, the carrier base being formed by the receiving profiled member 32 and/or the receiving surface 5.

In FIG. 2 the upper mounting profiled member 9 is illustrated. Advantageously, the upper mounting profiled member 9 is similar to the lower one 2 and comprises a mobile lateral section, here detached and not shown, and a carrier element 4. However, the carrier element 4 no longer has the role of supporting the weight of the module. The carrier element 4 forms a barrier between the diodes and the glazing unit in order to protect the diodes during the installation of the glazing unit. Furthermore, it allows the diodes and their PCB and their receiving profiled member 32 to be supported, the platen 40 thus being sufficiently rigid for the weight of the assembly of the receiving profiled member 32 and PCBs 31 carrying the diodes. This also allows the PCBs to be installed in their receiving profiled member prior to the placement of the glazing unit.

The upper mounting profiled member 9 advantageously comprises:

a body similar to the lower profiled member, comprising a U shape (whose opening is oriented downward) with a central section 90, a first lateral section 91 and a second lateral section 92 which is mobile so as to have ready access to the cavity of the 'U' in order to install/replace the lighting system 3 in it;

a receiving surface 5 for the lighting system;
preferably, an accommodation 6 for the passage of cables;
the platen 40 of the carrier element 4 is parallel and opposite to the central section 80.

The lighting system 3 of the upper mounting profiled member 9 preferably comprises diodes 30 fixed to their PCB 31, the whole assembly being carried by a receiving profiled member 32. The receiving profiled member 32 is sitting on the receiving surface 5, here formed by the face 42 of the platen 40 facing the central section.

The platen 40 serves to protect the diodes 30 from impacts during the installation of the module 10 and makes their installation simple prior to placement of the module.

Figure 8:
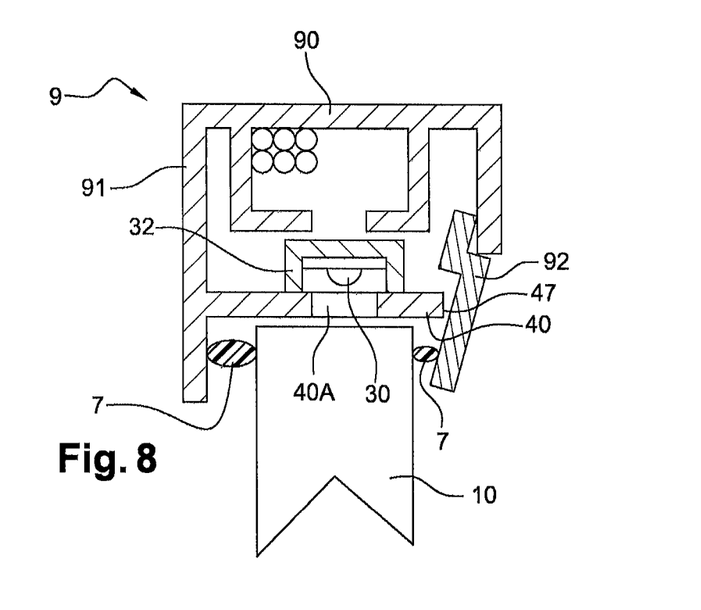
FIG. 8 schematic view of a transverse cross section of the upper side of the partition in the installed position of a glass module in an upper mounting profiled member according to one variant.

In the variant illustrated in FIG. 8, the platen 40 forming the receiving surface 5, forms an integral part of the mounting profiled member 9, in particular of the first lateral section 91.

The platen 40 comprises an orifice 40A or a window with a transparent full surface arranged facing the diodes 30 for the passage of the light.

In the installed position of the glazing unit 10, a gap of the order of a millimeter separates the platen 40 from the glazing unit.

The installation of a partition of the invention is carried out in the following manner with reference to the partition in FIG. 2.

When the carrier elements 4 are inserted into the lower 2 and upper 9 mounting profiled members, the latter are installed in the respective lower 2 and upper 9 mounting profiled members with the mobile lateral section 22, respectively 92, in the pivoted position or else detached.

The lower 2 and upper 9 mounting profiled members are respectively fixed to the ground and to the ceiling, their openings facing one another.

Transparent wedges 8 are disposed, where necessary, on the platen 40 of the carrier elements 4 of the lower mounting profiled member.

The lighting system 3 is disposed on the receiving surface 5.

The glass module is then positioned in front of the mounting profiled member and held in an inclined position by disposing the edge of its lower edge face on the carrier elements 4 of the lower mounting profiled member (or on the wedges 8, if these are needed), said profiled member having its mobile lateral section 22 removed.

Subsequently, the module 10 is tilted away from the installer in the direction of the first lateral sections 31, 91 of the lower and upper profiled members. The module is in place positioned vertically.

The lateral sections 22 of the upper and lower mounting profiled member are replaced.

Hermetic sealing means 7 are disposed in the voids separating the module from the free ends of the lateral sections 21 and 22, respectively 91, 92, of the mounting profiled member 2, 9.

It goes without saying that other variants may be envisioned without straying from the scope of the invention. The variants presented hereinabove relating to elements of one embodiment may be advantageously re-used in another embodiment, in particular relating to:

the length of the lateral section 22,
the accommodation 6 for running cables,
the type of receiving surface 5,
the use of a receiving profiled member 32 for the PCBs,
the shape of the receiving profiled member 32,
the shape of the carrier element 4
the fixing of the carrier element 4 when the latter is set in the mounting profiled member,
the beveled lower face 42 of the platen 40.

The invention claimed is:

1. An illuminating partition comprising:
   at least one glazing unit;
   diodes disposed on at least one support device, the at least one support device being on or accommodated in a receiving profiled member, the diodes being disposed facing an edge face of the glazing unit;
   at least one lower mounting profiled member and one upper mounting profiled member, each of the upper and lower mounting profiled members comprising a central section, a first lateral section perpendicular to the central section, and a second lateral section perpendicular to the central section, parallel to and spaced from the first lateral section, and each of the upper and lower mounting profiled members bounding a respective internal volume; and
   at least one carrier element separate from the at least one support device or from the receiving profiled member, a first of said at least one carrier element being arranged in the internal volume of the lower mounting profiled member, or a second of the at least one carrier element being arranged in the internal volume of the upper mounting profiled member or both a first and a second of the at least one carrier element being mounted respectively in the internal volume of the upper and lower mounting profiled members, and the at least one carrier element comprising a platen which is at a distance from the central section and situated between the edge face of the glazing unit and the diodes,
   wherein the platen of the carrier element is coupled with the first lateral section and has a free edge facing the second lateral section,
   wherein at a bottom of the partition, the platen supports the glazing unit directly or via a transparent wedge positioned underneath the glazing unit, and/or at a top of the partition, the at least one support device and/or the receiving profiled member are sitting on the platen,
   wherein the at least one support device with the diodes is dissociable from the partition, and
   the second lateral section of the lower and upper mounting profiled members is mobile or removable.

2. The partition as claimed in claim 1, wherein the free edge does not bend in a direction of the central section, nor is any barrier element disposed between the diodes and the mobile second lateral section.

3. The partition as claimed in claim 1, wherein the carrier element forms a member which is inserted by removable mounting or by rigid fixing, via an edge opposite to the free edge that is coupled with the first lateral section of the mounting profiled member.

4. The partition as claimed in claim 1, wherein the carrier element forms a member machined/profiled in a unitary manner with the first lateral section of the mounting profiled member.

5. The partition as claimed in claim 1, comprising a surface for receiving the at least one support device or the receiving profiled member, wherein, in the upper mounting profiled member, the receiving surface corresponds to a first face of the platen that is opposite a second face of the platen that faces the glazing unit.

6. The partition as claimed in claim 1, wherein the carrier element forms an insert and has a general shape at least in the form of an "L" according to a cross-sectional view transverse to its longitudinal extension, and comprises a support surface arranged parallel to the central section of the mounting profiled member and a perpendicular side coupled with the first lateral section and/or with the central section.

7. The partition as claimed in claim 1, wherein the carrier element forms an insert and has a general shape in the form of an "F" according to a cross-sectional view transverse to its longitudinal extension.

8. The partition as claimed in claim 1, wherein the carrier element comprises a shoulder arranged in an extension of a side of the carrier element that is parallel to the first and/or second lateral section, the shoulder configured to cooperate by mutual interlocking with a surface of the first lateral section.

9. The partition as claimed in claim 8, wherein the side and the shoulder are set against an internal face of the first lateral section by their external vertical face opposite to the platen, and held by cooperation with said first lateral section.

10. The partition as claimed in claim 8, wherein an edge of the platen opposite to the free edge, the side and/or the shoulder of the carrier element cooperate with the first lateral section of the profiled member by adhesive bonding and/or by mutual interlocking.

11. The partition as claimed in claim 1, wherein the platen comprises at least one orifice or one full transparent window.

12. The partition as claimed in claim 1, wherein the at least one support device or the receiving profiled member is assembled so as to be free or fixable and removable by pivoting or retraction of the second lateral section.

13. The partition as claimed in claim 1, wherein, for the bottom or top of the partition, the receiving profiled member is inserted into the mounting profiled member or, for the bottom of the partition, the receiving profiled member forms an integral part of the internal volume of the lower mounting profiled member.

14. The partition as claimed in claim 1, comprising a receiving surface for receiving the at least one support device or the receiving profiled member, the receiving surface being associated with the carrier element or with the mounting profiled member, and is disposed between the platen and the central section of the mounting profiled member, wherein said receiving surface is solid or hollowed out, and/or in two parts.

15. The partition as claimed in claim 5, comprising a cavity with two walls with returns, the cavity being arranged between the receiving surface and the central section, an upper surface of the cavity being designed to form said receiving surface.

16. The partition as claimed in claim 15, wherein an association of the receiving profiled member or else of the at least one support device is made by being directly laid on the receiving surface, or by a removable attachment.

17. The partition as claimed in claim 1, comprising at least two vertically butt-joined glazing units and wherein no lighting system is arranged on the vertical side of one of the glazing units butt-joined to the other one of the glazing units.

18. The partition as claimed in claim 1, wherein the lower mounting profiled member of the partition comprises the at least one glazing unit, at least two carrier elements arranged at respective distal ends of the glazing unit and only extending partially over a length of said glazing unit.

19. The partition as claimed in claim 6, wherein the perpendicular side abuts to the first lateral section and/or to the central section.

20. The partition as claimed in claim 11, wherein the at least one orifice or one full transparent window has an oblong geometry that is continuous over a whole length of the platen.

21. An illuminating partition comprising:
a glazing unit;
a plurality of diodes disposed on a support device, the support device being on or accommodated in a receiving profiled member, the plurality of diodes being disposed facing an edge face of the glazing unit;
a lower mounting profiled member and an upper mounting profiled member, each of the upper and lower mounting profiled members comprising a central section, a first lateral section perpendicular to the central section, and a second lateral section perpendicular to the central section, the second lateral section parallel to and spaced from the first lateral section, and each of the upper and lower mounting profiled members bounding a respective internal volume; and
a carrier element separate from the support device or from the receiving profiled member or from both, said carrier element being arranged in the internal volume of the lower mounting profiled member, and the carrier element comprising a platen which is at a distance from the central section of the lower mounting profiled member and located between the edge face of the glazing unit and the plurality of diodes,
wherein the platen of the carrier element is coupled with the first lateral section and has a free edge facing the second lateral section,
wherein, at a bottom of the partition, the platen supports the glazing unit directly or via a transparent wedge positioned underneath the glazing unit,
wherein the support device with the diodes is dissociable from the partition, and
wherein the second lateral section of the lower and upper mounting profiled members is mobile or removable.

22. The partition as claimed in claim 1, wherein the glazing unit is formed from a monolithic glass sheet.

23. The partition as claimed in claim 1, wherein the glazing unit includes at least two glass substrates.

24. The partition as claimed in claim 21, wherein the glazing unit is formed from a monolithic glass sheet.

25. The partition as claimed in claim 21, wherein the glazing unit is formed from a monolithic glass sheet.

26. The partition as claimed in claim 21, further comprising an additional carrier element that is arranged in the internal volume of the upper mounting profiled member, and the additional carrier element comprising a platen which is at a distance from the central section of the upper mounting profiled member.

* * * * *